(12) United States Patent
Field et al.

(10) Patent No.: US 11,023,864 B2
(45) Date of Patent: Jun. 1, 2021

(54) SYSTEM AND METHOD FOR INTEGRATING PRIVACY INTO CONTACT MANAGEMENT SYSTEMS

(71) Applicant: New York Life Insurance Company, New York, NY (US)

(72) Inventors: Christopher C. Field, Brooklyn, NY (US); William W. Mak, New York, NY (US); Aaron M. Zachko, Tenafly, NJ (US)

(73) Assignee: NEW YORK LIFE INSURANCE COMPANY, New York, NY (US)

( * ) Notice: Subject to any disclaimer, the term of this patent is extended or adjusted under 35 U.S.C. 154(b) by 624 days.

(21) Appl. No.: 14/714,533

(22) Filed: May 18, 2015

(65) Prior Publication Data

US 2016/0125364 A1 May 5, 2016

Related U.S. Application Data (60) Provisional application No. 61/994,457, filed on May 16, 2014.

(51) Int. Cl.
| | | |
|---|---|---|
| *G06Q 10/10* | (2012.01) | |
| *H04W 12/02* | (2009.01) | |
| *H04M 3/51* | (2006.01) | |
| *H04L 29/06* | (2006.01) | |
| *H04L 29/12* | (2006.01) | |
| *G06Q 30/02* | (2012.01) | |
| *G06Q 10/06* | (2012.01) | |

(52) U.S. Cl.
CPC .... *G06Q 10/1097* (2013.01); *H04L 29/12433* (2013.01); *H04L 63/0414* (2013.01); *H04M 3/5183* (2013.01); *H04W 12/02* (2013.01); *G06Q 10/06398* (2013.01); *G06Q 30/0241* (2013.01); *H04L 61/1594* (2013.01); *H04L 61/2596* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,630,986 | B1* | 12/2009 | Herz | G06Q 10/10 |
| 8,824,664 | B1* | 9/2014 | Ristock | H04L 47/286 379/266.01 |
| 9,444,940 | B2* | 9/2016 | Skiba | H04M 3/5233 |

(Continued)

*Primary Examiner* — Crystol Stewart
(74) *Attorney, Agent, or Firm* — McDermott Will & Emery LLP (57) ABSTRACT

A system for managing contact information, the system comprising a processor and a memory having executable instructions stored thereon that when executed by the processor cause the processor to retrieve data for a sales lead from a database, the data including actual contact information of the sales lead, generate first pseudo-contact information that corresponds to the actual contact information of the sales lead, provide a first agent with access to the first pseudo-contact information on a communication system, receive a communication request including the first pseudo-contact information from a client device of the first agent, and link the first pseudo contact information to the actual contact information of the sales lead to establish a communication connection between the client device of the first agent to a client device of the sales lead.

14 Claims, 6 Drawing Sheets

(56) References Cited

U.S. PATENT DOCUMENTS

| | | | |
|---|---|---|---|
| 9,742,916 B1* | 8/2017 | Christopher | H04M 3/5141 |
| 2003/0158960 A1* | 8/2003 | Engberg | G06Q 20/02 |
| | | | 709/237 |
| 2004/0015699 A1* | 1/2004 | Thomas | G06Q 10/10 |
| | | | 713/179 |
| 2004/0138944 A1* | 7/2004 | Whitacre | G06Q 10/10 |
| | | | 705/7.42 |
| 2005/0289004 A1* | 12/2005 | Lu | G06Q 30/02 |
| | | | 705/14.69 |
| 2007/0150357 A1* | 6/2007 | Shin | G06Q 30/02 |
| | | | 705/14.14 |
| 2008/0065501 A1* | 3/2008 | Stuart | G06Q 30/0601 |
| | | | 705/26.1 |
| 2008/0183631 A1* | 7/2008 | Ranin | G06Q 30/0603 |
| | | | 705/80 |
| 2009/0254971 A1* | 10/2009 | Herz | G06Q 10/10 |
| | | | 726/1 |
| 2010/0088191 A1* | 4/2010 | Ku | G06F 21/6263 |
| | | | 705/26.1 |
| 2010/0161747 A1* | 6/2010 | Rayan | H04L 29/12433 |
| | | | 709/206 |
| 2010/0299650 A1* | 11/2010 | Abrahamsen | G06Q 10/10 |
| | | | 717/102 |
| 2012/0005102 A1* | 1/2012 | McClung | G06Q 30/0615 |
| | | | 705/80 |
| 2012/0106729 A1* | 5/2012 | Carter | H04M 3/5183 |
| | | | 379/265.02 |
| 2012/0259768 A1* | 10/2012 | Mukherjee | G06Q 40/02 |
| | | | 705/39 |
| 2013/0232062 A1* | 9/2013 | Leventhal | G06Q 10/1053 |
| | | | 705/39 |
| 2013/0297442 A1* | 11/2013 | Simons | G06Q 30/02 |
| | | | 705/26.4 |
| 2013/0304900 A1* | 11/2013 | Trabelsi | H04L 67/1057 |
| | | | 709/224 |
| 2014/0058831 A1* | 2/2014 | Duva | H04M 3/51 |
| | | | 705/14.45 |
| 2014/0214943 A1* | 7/2014 | Shapero | H04L 51/32 |
| | | | 709/204 |
| 2014/0316927 A1* | 10/2014 | Ganesan | G06Q 30/06 |
| | | | 705/26.4 |
| 2014/0369485 A1* | 12/2014 | Hollander | H04M 3/42008 |
| | | | 379/265.02 |
| 2015/0046219 A1* | 2/2015 | Shavlik | G06Q 30/0203 |
| | | | 705/7.31 |
| 2015/0178765 A1* | 6/2015 | McBride | G06Q 30/0241 |
| | | | 705/14.69 |
| 2016/0071134 A1* | 3/2016 | Duncan | G06Q 30/0202 |
| | | | 705/7.33 |

* cited by examiner

Sales Agent A

| Name | Lead Source | Email | Phone | Status | Time Remaining |
|---|---|---|---|---|---|
| Joe Smith | Corporate | 111JSmith123@email.com | 999-555-1584 | Completed | - |
| Terry Johnson | Regional Office A | 111TJohnson123@email.com | 999-555-4653 | Follow Up | 10 Days |
| David Paulson | Affiliate | 111DPaulson123@email.com | 999-555-5648 | Pending | 5 Days |
| *Howard Anderson* | *Regional Office B* | 111HAnderson123@email.com | *999-555-3984* | *Expired* | *0 Days* |
| Jenny Woods | Sales Agent A | 111JWoods123@email.com | 999-555-8894 | Pending | 25 Days |

Sales Agent B

| Name | Lead Source | Email | Phone | Status | Time Remaining |
|---|---|---|---|---|---|
| Howard Anderson | Regional Office B | 222HAnderson123@email.com | 999-555-9412 | Pending | 30 Days |
| John Adams | Regional Office A | 222JAdams123@email.com | 999-555-1111 | Completed | - |
| Sam Jones | Corporate | 222SJones123@email.com | 999-555-8946 | Pending | 15 Days |
| | | | | | |
| | | | | | |

| Lead #1 | Agent - to - Consumer | | | |
|---|---|---|---|---|
| | Consumer Real Contact Information | | Proxy Contact Information Provided to Agent | |
| | Phone Number | 212-555-1212 | Toll Free Number & Extension | 888-647-1478 extension: 98635 |
| | Email Address | consumer1@gmail.com | Email | lm2678@leads.newyorklife.com |
| | Consumer - to - Agent | | | |
| | Agent (John Smith) Real Contact Information | | Proxy Contact Information Provided to Consumer | |
| | Phone Number | 917-555-1212 | Toll Free Number & Extension | 888-748-4178 extension: 54789 |
| | Email Address | agent1@ft.newyorklife.com | Email | la8876@leads.newyorklife.com |

602 (Agent-to-Consumer section)
604 (Consumer-to-Agent section)

610

| Lead #2 | Agent - to - Consumer | | | |
|---|---|---|---|---|
| | Consumer Real Contact Information | | Proxy Contact Information Provided to Agent | |
| | Phone Number | 212-777-1212 | Toll Free Number & Extension | 888-647-1478 extension: 75984 |
| | Email Address | consumer2@gmail.com | Email | lm8752@leads.newyorklife.com |
| | Consumer - to - Agent | | | |
| | Agent (John Smith) Real Contact Information | | Proxy Contact Information Provided to Consumer | |
| | Phone Number | 917-555-1212 | Toll Free Number & Extension | 212-899-1212 extension: 32587 |
| | Email Address | agent1@ft.newyorklife.com | Email | la8793@leads.newyorklife.com |

612 (Agent-to-Consumer section)
614 (Consumer-to-Agent section)

Fig. 6

SYSTEM AND METHOD FOR INTEGRATING PRIVACY INTO CONTACT MANAGEMENT SYSTEMS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The inventions described herein generally relate to managing contact information, and in particular, managing privacy of contact information used in customer relationship management systems.

BACKGROUND OF THE INVENTION

Sales leads play an important role in the operations of a firm, company or other entity as they form one of the bases for the generation of new business. The number of leads that are received every day may be in the hundreds or thousands. Further, a company or other entity may utilize hundreds or thousands of agents, e.g., the persons who will ultimately work the leads with the potential customers. The agents or other persons handling the leads may be distributed over various regions and have varying expertise. However, known systems and methods fail to allow effective maintenance of leads. Shortcomings of existing systems include, for example, deficiencies in tracking the history of a lead and lack of control over the handling and outcome of a lead.

Sales leads can be obtained from any of a wide variety of sources. Before the Internet, businesses sought to generate leads through the use of junk mail, or the collection of contact information from those who enter to win something free, like a car or a vacation. Additionally, there was the use of referral-based lead calling. Since the establishment of the Internet, spam e-mail and other forms of advertising have also been developed to entice consumers with free or reduced cost goods or services as a way to get more consumers to reach a vendor's website.

Once at a vendor website, an Internet user performs a transaction that is deemed the main purpose for the business of the website, such as supplying the details of a credit card application, signing up for a free newsletter, or some other similar activity. Private lead information of the user, or "lead provider," may be gathered by the vendor or advertiser (which can be the same entity) and sold to a commercial consumer of leads, usually a consumer in the business related to the purpose of the lead provider's visit to the vendor's website. Currently, once a lead provider submits over the Internet his or her private lead information, such as name, address, phone number, social security number, etc., the lead provider loses control of how that information is handled.

The methods and systems of the present invention address the above problems, as well as other problems and shortcomings of known techniques for processing sales leads data.

SUMMARY OF THE INVENTION

The present invention provides a system for managing contact information, the system comprising a processor and a memory having executable instructions stored thereon that when executed by the processor cause the processor to retrieve data for a sales lead from a database, the data including actual contact information of the sales lead, generate first pseudo-contact information that corresponds to the actual contact information of the sales lead, provide a first agent with access to the first pseudo-contact information on a communication system, receive a communication request including the first pseudo-contact information from a client device of the first agent, and link the first pseudo contact information to the actual contact information of the sales lead to establish a communication connection between the client device of the first agent to a client device of the sales lead.

The first pseudo-contact information can be provided to the first agent instead of the actual contact information of the sales lead. The first pseudo-contact information may include an expiration the processor may determine whether the first agent has performed a given task before the expiration. In a further embodiment, the processor is operable to disable the first pseudo-contact information upon the expiration. The processor may also increase a score associated with the first agent upon completion of the given task or penalize a score associated with the first agent upon the expiration.

According to one embodiment, the processor is further operable to reassign the sales lead to a second agent, disable the first pseudo-contact information, regenerate the first-pseudo contact information in the form of second pseudo-contact information, provide the second agent with access to the second pseudo-contact information on the communication system, receive a communication request including the second pseudo-contact information from a client device of the second agent, link the second pseudo contact information to the actual contact information of the sales lead, and establish a communication connection between the client device of the second agent to the client device of the sales lead. In certain embodiments, the processor is further operable to generate agent pseudo-contact information from actual contact information of the first agent, provide a marketing offer including the agent pseudo-contact information to a consumer wherein the agent pseudo-contact information is provided to the consumer instead of the actual contact information associated with the first agent, and monitor responsiveness of the first agent associated with the marketing offer.

In another embodiment, the system comprises a sales lead management server comprising a processor, and a memory having executable instructions stored thereon that when executed by the processor cause the processor to retrieve sales lead data from a database, generate first pseudo-contact information for the sales lead data, provide the first pseudo-contact information to a client device of a first agent, assign tasks to accomplish using the first pseudo-contact information by the first agent before a deadline, monitor activities of the client device, determine non-fulfillment of the assigned tasks based on the monitored activities, and disable the first pseudo-contact information.

The processor may be further configured to track communication attempts and successful communication connections. According to one embodiment, the assigned tasks include initiating one or more communication attempts, successful communication attempts, completion of a sale, and activity to advance progress of a potential sale. The processor may also be further configured to generate second pseudo-contact information for the sales lead data, provide the second pseudo-contact information to a client device of a second agent, and assign tasks to accomplish using the second pseudo-contact information by the second agent before a second deadline. The second pseudo-contact information differs from the first pseudo-contact information.

BRIEF DESCRIPTION OF THE DRAWINGS

Embodiments of the invention are illustrated in the figures of the accompanying drawings which are meant to be exemplary and not limiting, in which like references are intended to refer to like or corresponding parts, and in which.

DETAILED DESCRIPTION OF THE INVENTION

Subject matter is now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

Figure 1:
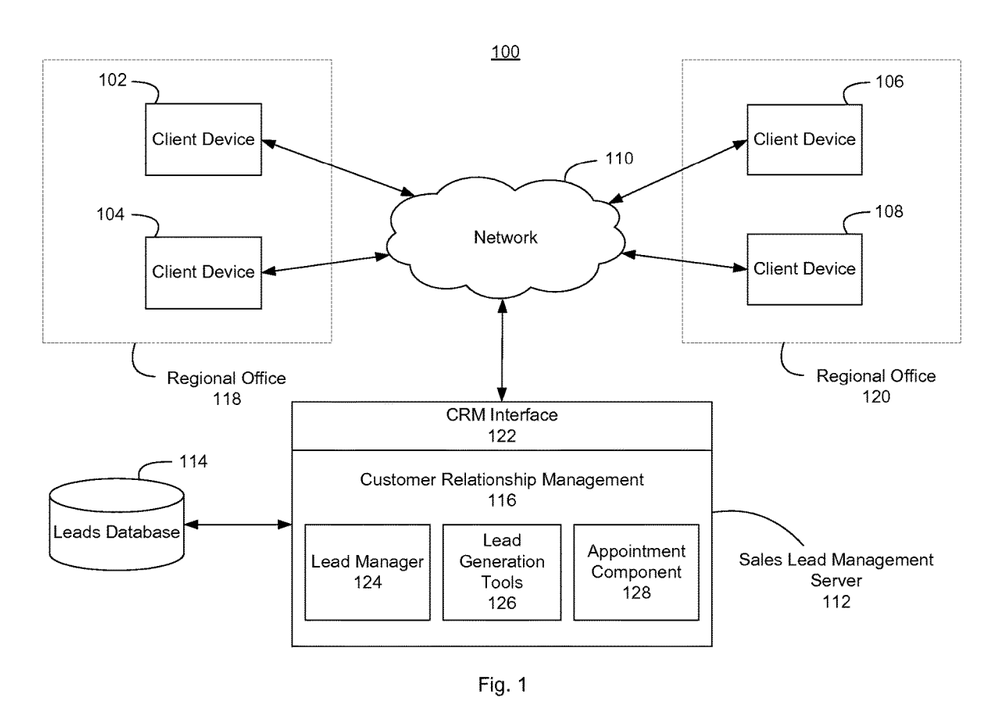
FIG. 1 illustrates a computing system for managing contact information according to one embodiment of the present invention.

FIG. 1 illustrates a computing system for managing contact information according to one embodiment of the present invention. The exemplary system 100 presented in FIG. 1 includes client devices 102, 104 at a first regional office 118, client devices 106, 108 at a second regional office 120, a network 110, a sales lead management server 112 and a sales lead database 114. Client devices 102, 104, 106 and 108 may comprise computing devices (e.g., personal computers, mobile devices, laptops, personal digital assistants (PDA), cell phones, tablet computers, or any computing device having a central processing unit and memory unit capable of connecting to a network). The client devices 102, 104, 106 and 108 may also comprise a graphical user interface ("GUI") or a browser application provided on a display (e.g., monitor screen, LCD or LED display, projector, etc.) as well as one or more input devices (e.g., keyboard, mouse, pen, etc.). A given client device 102, 104, 106 and 108 may vary in terms of capabilities or features that the given device provides.

A client device 102, 104, 106 and 108 may include or execute an application to communicate content, such as, for example, textual content, multimedia content, or the like, and may also include or execute one or more applications to perform a variety of possible tasks, such as browsing, searching, etc. A client device 102, 104, 106 and 108 may also include or execute a variety of operating systems, including a personal computer operating system, such as a Windows, Mac OS or Linux, or a mobile operating system, such as iOS, Android, or Windows Mobile, or the like. Additionally, a client device 102, 104, 106 and 108 may include or may execute a variety of possible communication applications, such as a client software application enabling communication with other devices, e.g., communicating one or more messages via email, short message service ("SMS"), multimedia message service ("MMS"), or various networks, such as social networks, including, for example, Facebook, LinkedIn, Twitter, Flickr, or Google+, to provide only a few possible examples. The foregoing is provided to illustrate that claimed subject matter includes a wide range of possible features or capabilities.

The term "social network" refers generally to a network of individuals, such as acquaintances, friends, family, colleagues, or co-workers, who may be coupled via a communications network or via a variety of sub-networks. Potentially, additional relationships may subsequently form as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. A social network may include individuals with similar experiences, opinions, education levels or backgrounds.

A social network for a given individual may refer to a set of direct personal relationships (first order relationships) or a set of indirect personal relationships (second and third order relationships). A direct personal relationship refers to a relationship for an individual in which communications may be directly sent from individual to individual, such as with family members, friends, colleagues, co-workers, or the like. An indirect personal relationship refers to a relationship between individuals where no form of direct individual to individual communication may have taken place, such as a friend of a friend, or the like. A social network also may generate relationships or connections with entities other than a person, such as companies, brands, or so called 'virtual persons.' Different privileges or permissions may be associated with relationships in a social network on the basis of varying orders of the relationships. Additionally, a social network for a given individual may be represented in a variety of forms, such as visually, electronically or functionally. For example, a "social graph" or "socio-gram" may represent an entity in a social network as a node and a relationship as an edge or a link between nodes.

Client devices 102, 104 at regional office 118 and client devices 106, 108 at regional office 120 are communicatively connected to sales lead management server 112 over a communications network 110. Network 110 may be any suitable type of network that allows for the transport of data communications. The network 110 may couple devices, e.g., client devices 102, 104, 106 and 108, so that communications may be exchanged, such as between sales lead management server 112 and a client device, including between a wireless client device coupled via a wireless network, for example. The network may also include mass storage, such as network attached storage ("NAS"), a storage area network ("SAN"), or other forms of computer or machine readable media, for example. In one embodiment, the network 110 may be the Internet, following known Internet protocols for data communication, or any other communication network, e.g., any local area network ("LAN") or wide area network ("WAN") connection, wire-line type connections, wireless type connections, or any combination thereof. Communications and content stored and/or transmitted may be encrypted using one or more techniques, e.g., the Advanced Encryption Standard (AES) with a 256-bit key size, or any other encryption standard known in the art.

Sales lead management server 112 may vary in configuration or capabilities, but includes one or more central processing units and memory, including various combinations of persistent and transient storage. The sales lead management server 112 may also include one or more mass storage devices, one or more power supplies, one or more wired or wireless interfaces to the network 110, one or more input/output interfaces, or one or more operating systems, such as Windows Server, Mac OS X, Unix, Linux, FreeBSD, or the like. According to one embodiment, sales lead management server 112 may host or execute computer instructions to provide a customer relationship management ("CRM") system 116 for managing a company's interactions with current and future customers. The CRM 116 provides computational infrastructure and tools for management of customer and prospect contact information, accounts, leads and sales opportunities in one central location, e.g., via cloud so the information is accessible in real time by multiple users.

Client devices 102, 104, 106, and 108 may access the CRM 116 over network 110 using a CRM interface 122. CRM interface 122 may either be client-side software or accessed remotely through a web-browser via the Internet, e.g., provided as a cloud service or software as a service ("SaaS"). Using client devices 102, 104, 106 and 108, users such as agents may be provided with access to application software of CRM 116 and sales lead database 114, which may be hosted on the sales lead management server 112 (as illustrated in the FIG. 1) or on remote servers. As used herein, an "agent" or "sales agent" may be interpreted to mean an individual who is assigned "sales leads", e.g., providing client contact information with the objective of attaining sales, including working with a person to effect a purchase.

The CRM 116 may organize tasks, contacts, accounts, meetings, and sales. An additional module of CRM 116 includes appointment component 128 that can automatically provide suitable appointment times to customers via e-mail or the web, which are then synchronized with a calendar of a representative or agent. The CRM 116 may be used to automate and synchronize sales and marketing via a combination of lead manager 124, lead generation tools 126 and appointment component 128.

Sales leads may be generated from agents associated with client devices 102, 104, 106, and 108 in regional offices 118 and 120 and/or automatically by sales lead management system 112. Lead generation includes the process of creating sales leads which might convert into sales for a company. Sales leads may result from people, who are interested in making a purchase, submitting information, e.g., such as a person responding to a mailing from an insurance provider. According to the illustrated embodiment, sales lead management server 112 includes lead generation tools 126. Lead generation tools 126 may assist agents in generating or automatically generating a plurality of leads originating from various sources or activities.

Generating leads may include relying on referrals, telemarketers, list purchase, CRM efforts, a company website, traditional (e.g., television, radio) or online advertising, mailings (either physical or electronic), text messages, or other corporate marketing activities. The lead generation tools may also allow agents to see existing contacts' profiles and accounts on social media and networking sites. For example, lead generation tools 126 may be integrated with social media sites like Twitter, LinkedIn, Facebook, YouTube, and Google+ to communicate with and track customers sharing opinions and experiences with a company, products or services. Users of client devices 102, 104, 106, and 108 may access activity, profile information, interests, preferences, affiliations, and any other obtainable information from social media sites using the lead generation tools 126 to determine potential customers' interests and needs, useful in the lead generation process.

Sales lead management system 112 further includes sales lead database 114. Database 114 is operable to store, index, and load information regarding various sales leads. Sales leads in lead database 114 may be distributed and assigned to specific agents to follow up and work on those leads. Assigning the sales leads may include transmitting or allowing access to pseudo-contact information by agents via a user space, communication system interface (e.g., email client, instant messenger, VoIP software, virtual video conferencing, etc.), docketing system, a directory system, and/or contact management system. Sales lead management system 112 further includes lead manager 124. However, in an alternative embodiment, lead manager 124 may be implemented independently of CRM 116 as a stand-alone component running on sales lead management server 112 or on another server.

According to one embodiment, lead manager 124 may automatically assign leads to a plurality of agents randomly or in accordance with predetermined rules. For example, lead manager 124 may include logic for assignment of sales leads to agents based on a set of rules or criteria such as workload, quota, or as defined by an administrator/manager. In another embodiment, lead manager 124 may calculate a score for every agent based on their performance, experience, skills, etc., and use the calculated score to assign leads. This score may be characterized in a sales agent performance profile.

Lead manager 124 may be accessed to provide lead data. Lead data may be transmitted over network 110 via CRM interface 122 from client devices 102, 104, 106, or 108. The lead data may include information such as the name of a potential client, address, email, phone number, any other contact information, and how the lead was acquired, to name a few. The CRM interface 122 may be integrated into the agents' calendar, contact list, or productivity software on their client devices for utilizing and accessing the lead data. According to one embodiment, the CRM interface 122 may include functionalities such as click-to-call, links to email, social media, or online messaging, and other communication tools that are made available with the contact information.

A challenge arises with the fact that sales agents may not be able to timely act on leads distributed to them. As a result, lead follow-up rates through agents after the leads are sent out to those agents are often unsatisfactory. According to embodiments of the present invention, this problem is solved by a combination of providing pseudo-contact information of leads to agents and setting an expiration feature to each lead.

Lead manager 124 may provide a communication proxy mechanism for masking lead data by generating pseudo-contact information corresponding to actual contact information of the leads such as telephone contact information (e.g., telephone number, telephone number with extension, toll-free telephone number, or toll-free telephone number with extension), email addresses, or physical addresses (home and/or business). In another embodiment, pseudo-contact information may include proxy contact information that completely or partially masks the actual contact details. A unique proxy contact may be generated for each lead that an agent may contact. The pseudo-contact information can be provided to a first agent assigned with the corresponding sales lead and given a period to work on the lead before expiration. Pseudo-contact information may be linked or forwarded to the actually contact information by the CRM or an integrated communication system. If the first agent is unable to work on the lead before expiration, the sales lead may be re-assigned to a second agent where the pseudo-contact information is disabled, unlinked, or rendered inoperative to prevent the first agent from contacting the sales lead after expiration. The same communication proxy mechanism for providing lead contact information may also be used in allowing a lead to contact an agent. For example, as part of a marketing campaign, advertising content may be provided to consumers or clients identified as potential sales leads (e.g., via email, web/video-advertising, direct mail, etc.). The ads may include a unique set of pseudo-contact information that is provided to the potential leads to communicate directly with pre-assigned agents or agents who are currently assigned to work on the potential leads. The pseudo-contact information provided to the potential leads may stay constant even if the lead is assigned to a new agent.

Additional features provided by lead manager 124 may include managing the sales leads after assignment to an agent. For example, lead manager 124, either alone or in combination with CRM 116, handles updates regarding the status of a lead, assess leads inventory, and a variety of other procedures associated with sales lead maintenance. Lead manager 124 may re-assign sales leads according to rules that may be set by a sales manager to meet certain deadlines or if the agent is unable to work on a sales lead in a timely manner.

Figure 2:
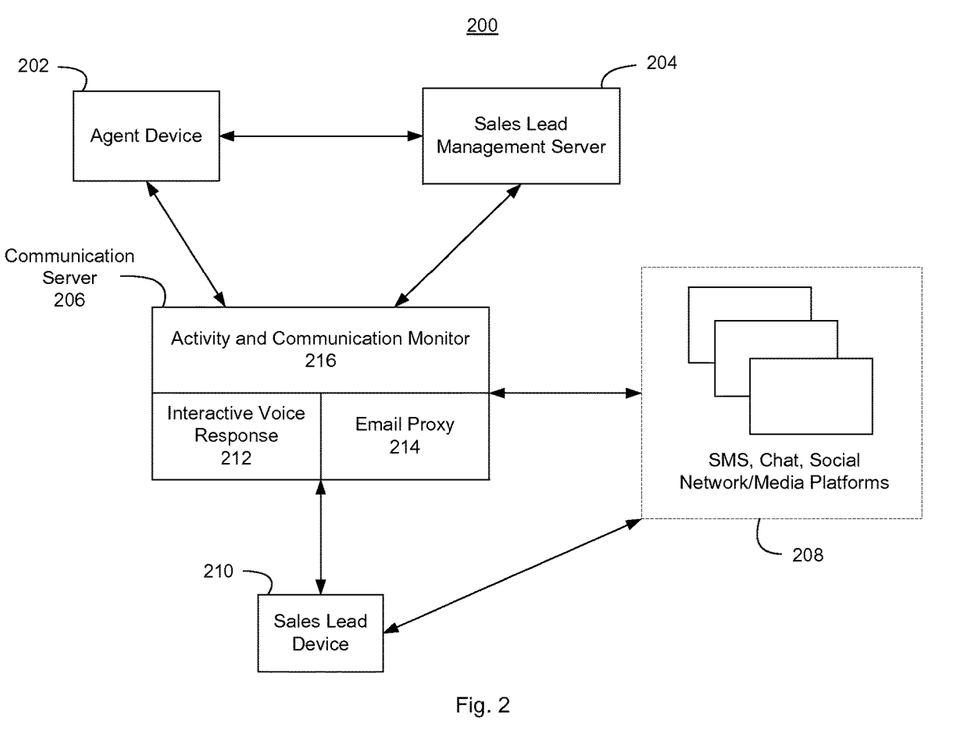
FIG. 2 illustrates a computing system for monitoring leads data according to one embodiment of the present invention.

FIG. 2 presents a computing system for monitoring sales leads according to one embodiment of the present invention. The exemplary system 200 presented in FIG. 2 includes communication server 206 serving as an intermediary in communications between agent device 202 and sales lead device 210. It is to be understood that agent device 202 and sales lead device 210 are each representative of one or more devices. Agent device 202 may be a client device or a collection of devices including devices such as a workstation, an IP phone, facsimile machine, etc., used by agents to communicate with sales leads at sales lead device 210 (which may also include client devices or a collection of devices similar to agent device 202).

Sales leads data may be received or retrieved by sales lead management server 204 from sales lead sources such as a database of sales leads collected from one or more websites, third party sources, other agents, etc. The sales leads data may include contact information of sales leads such as telephone numbers, email addresses, online messaging and social network user names (e.g., SKYPE, WhatsApp, Facebook, Twitter), etc. Sales lead management server 204 can be configured to generate pseudo-contact information from the sales lead data. Sales leads may be assigned to agents by sales lead management server 204 with deadlines and certain tasks to accomplish before an expiration date such as contacting the sales leads. Assignment of the sales leads includes providing the agents with the pseudo-contact information corresponding to the assigned sales leads.

Communication server 206 may be accessible by agents using agent device 202 to communicate with sales lead device 210. Agents may be associated with given credentials, profiles, and/or user spaces when interacting with communication server 206. For example, the given credentials, profiles, and/or user spaces may allow agents access and ability to contact certain sales leads with pseudo-contact information specifically assigned to them. The communication server 206 is operable to relay, link, or otherwise translate between the pseudo-contact information and the real contact information to facilitate communications between agent device 202 and sales lead device 210. Communication requests may be received by the communication server 206 from agent device 202 including the pseudo-contact information. The communication server 206 may then associate the pseudo-contact information with the real contact information of the sales lead device 210 and establish a communication connection between the agent device 202 and sales lead device 210. Call-based and email-based communications between agent device 202 and sales lead device 210 may be facilitated by Interactive Voice Response (IVR) telephone system 212 and email proxy 214 on communication server 206, respectively. SMS, chat, social network or media messaging, and other types of messages between agent device 202 and sales lead device 210 may be routed through third party platforms (SMS, chat, social network/media platforms 208) by communication server 206.

Communication server 206 includes activity and communication monitor 216 operable to monitor the calls, emails, SMS, chat, social network/media communications, etc. between agent device 202 and sales lead device 210 to capture communication events and follow-up activities. The monitored events and activities from activity and communication monitor 216 may be transmitted to and analyzed by sales lead management server 204 to determine fulfillment or non-fulfillment of one or more tasks based on the monitored events and activities. Non-fulfillment of the one or more tasks after an expiration date may cause communication server 206 to reassign sales leads to other agents.

Activity and communication monitor 216 may automatically monitor and track information (an agent's responsiveness) such as the times and number of communication attempts, agent feedback via IVR, and time and length of successful communication connections (e.g., a call, email, or message that resulted in a conversation or voice-message from the sales lead). Sales lead management server 204 may use information collected by activity and communication monitor 216 to expire and re-assign a lead if the follow-up activity does not fulfill certain minimum requirements or required tasks. Requirements may include leaving a message, initiating one or more communication attempts, a successful communication attempt, completion of a sale, or any other activity to advance progress of a potential sale. In one embodiment, the expiration of a sales lead may be extended if a determination is made from activities monitored by activity and communication monitor 216 that the agent has made sufficient communication efforts to reach the sales lead.

Figure 3:
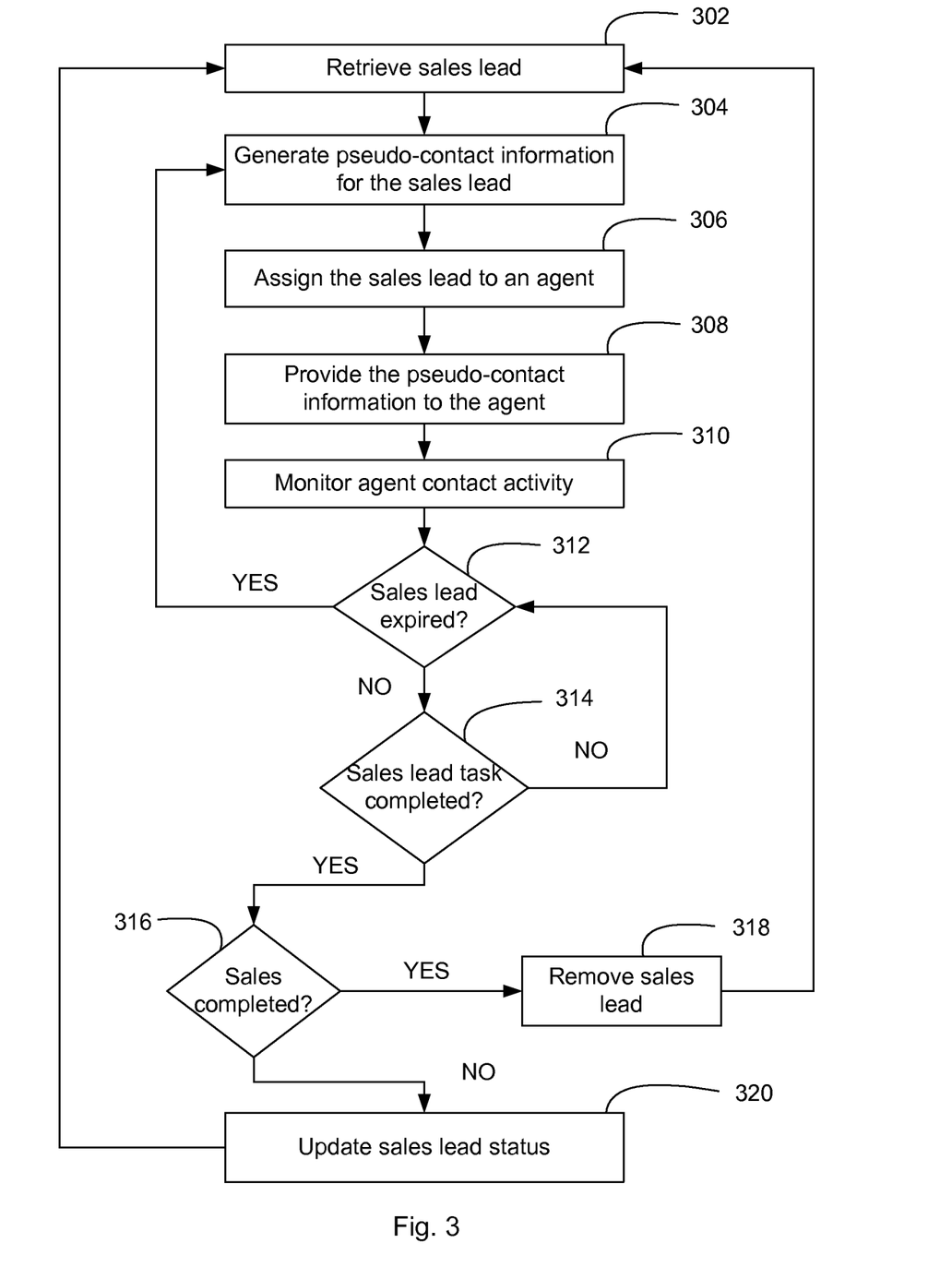
FIG. 3 illustrates a flowchart of a method for managing contact information according to one embodiment of the present invention.

FIG. 3 presents a flowchart of a method for managing contact information according to one embodiment of the present invention. A sales lead is retrieved, step 302, from a pool of available sales leads by a lead manager process, task or operation. The sales lead may be arbitrarily or selectively retrieved from a pool of sales leads from a leads database. One or more sales leads in the database may be aggregated from lead generation tools that of which mine, extract, or otherwise receive contact information of sales leads from various sources such as websites, social media, online directories, sweepstakes, surveys, advertisements, product trial accounts, etc. Sales leads may be scored or ranked by a lead generation tool, software, or processor to determine their sales-readiness. In one embodiment, each sales lead in the pool may be scored based on factors including, but not limited to, sale probability, shown interest in a company or product, buying intentions, needs or buying cycle status, age, demographics, and geographic factors. By tracking prospective customer behaviors (e.g., their web and social media activities), a sales agent or software provided by sales lead management server (such as a lead generation tools) can determine the level of interest in various products by a given lead.

Pseudo-contact information is generated for the retrieved sales lead, step 304. As used herein, pseudo-contact information generally includes contact information (such as, a phone number or email address) that is masked with, substituted or represented by temporary contact information (e.g., a pseudo-phone number and/or a pseudo-email address) in lieu of the actual contact information. The pseudo-contact information may include a fixed lifetime or expiration that corresponds to a predetermined amount of time a sales agent has available to act on the sales lead. Upon expiration of the pseudo-contact information, the pseudo-contact information may be disabled or rendered non-functional. The pseudo-contact information can be implemented by one or more methods for linking or referencing to the actual contact information of a sales lead stored in a lead database. For example, calls directed to a pseudo-phone number may be either converted to a call to the actual phone number on a telephone network or the call may be forwarded to the actual phone number for bridging with the actual number. In a similar manner, emails directed to a pseudo-email address may be either converted to a message sent to the actual email address on an email client or the message may be forwarded to the actual email address.

The sales lead is assigned to an agent, step 306. According to one embodiment, assigning the sales lead to the agent may include selecting the agent based on a score, ranking, or priority of the agent, e.g., the agent's position in an assignment queue. Additionally, the assigned agent may be given a limited time to act on the sales lead (a sales lead expiration window). The sales lead expiration window may correspond to a predetermined amount of time an agent has to initiate one or more communications with the sales lead, close, or dispose of the sales lead. In another embodiment, the sales lead expiration window may be extended upon achievement of one or more predetermined tasks (e.g., an introduction email, attempted contact, completed research on the sales lead). Assigning the lead to the agent may also include linking or enabling the pseudo-contact information to actual contact information of the sales lead.

Upon assigning the sales lead to the agent, the system provides the pseudo-contact information to the agent, step 308. The pseudo-contact information is provided to the agent for the agent to establish communication with and following up on the sales lead. Pseudo-contact information may be accessible by the agent via a user space, CRM, communication system interface, a docketing system, a directory, and/or a contact management system. According to an embodiment of the present invention, the pseudo-contact information is configured to appear as "normal" contact information to the assigned agent. However, the actual contact information of the sales lead is actually hidden from the assigned agent. Therefore, the pseudo-contact information limits access by an agent to the actual contact information necessary to directly contact the sales lead outside the context of the system.

Contact activity of the agent is monitored, step 310. Communications between the agent and the sales lead may be tracked by a lead manager process, task or operation. Any call (or other messaging) attempts, connections, time of call (or communication), call length, number of call (or communication) attempts, etc., are monitored between the agent and sales lead. In addition, any communications via SMS, chat applications, social networking platforms, etc. may also be monitored. The agent's responsiveness and effectiveness of a lead generation activity and the engagement of the agent in making a direct communication to the sales lead may be determined from the monitored activities. Communication events and follow-up activity can be used to make a determination to expire and re-assign a lead if, for example, the follow-up activity does not meet certain minimum requirements.

A determination is made whether the sales lead expiration window for the agent has closed, step 312. If the sales lead for the agent has not expired, a further determination is made as to whether the agent has completed a task for the sales lead, step 314. A task for the sales lead may include contacting the lead, closing a sale, or any other task resulting in a sales lead disposition. In the case that a task has not been completed for the sales lead by the agent, the method continues to monitor expiration of the sales lead in step 312. However, if the agent had completed a task, the system determines whether the task is associated with the completion of one or more sales, step 316. If a sale(s) has been completed, the sales lead is removed from assignment to the agent, step 318 and a subsequent sales lead may be retrieved from the pool of sales leads. In one embodiment, if an agent completes a sales lead task, the agent may enjoy a reward (such as an increase or benefit) to their score or ranking, and therefore may receive additional sales leads. The status of the sales lead is updated for sales lead tasks that are not a completion of a sale, step 320. The method may proceed to step 302 to retrieve a subsequent sales lead from the pool of sales leads, and repeat steps 304 through 320 to continue the distribution of sales leads to the agent.

If the sales lead has expired in step 312, however, the method proceeds to step 304 where the pseudo-contact information is regenerated as new temporary contact information for the sales lead for distribution to a next agent. Any previously generated pseudo-contact information may be disabled and/or rendered inoperable. As a result, the initial sales agent loses the sales lead and is prevented from being able to contact the sales lead after conclusion of the sales lead expiration window. In one embodiment, the sales agent may also suffer or be levied a penalty (decrease) in his or her scoring or ranking. The sales lead is subsequently reassigned to a next agent, step 306, with the regenerated pseudo-contact information. Accordingly, steps 308 through 312 may be repeated for the next agent in an attempt to close a sale for the sales lead.

Figure 4:
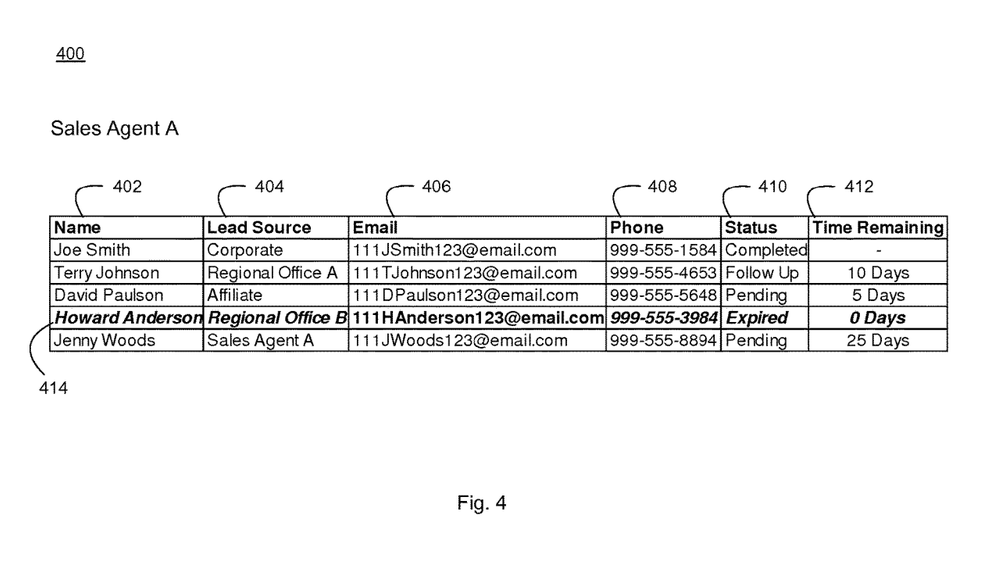
FIG. 4 illustrates a sales lead docket for managing contact information according to one embodiment of the present invention.

FIG. 4 presents a sales lead docket for managing contact information according to one embodiment of the present invention. Docket 400 includes a list of sales leads for "Sales Agent A," provided by a sales lead management server. Name column 402 lists the name of a contact associated with a sales lead. Lead source column 404 includes an identification of the source of a given sales lead. A sales lead may originate from corporate or agent marketing activities (e.g., mailing, advertising, social media, corporate website), a regional office (such as from a sales agent), an affiliate (such as third parties that provide sales leads), etc.

Email column 406 displays an email address and phone column 408 displays a phone number, both of which are provided to "Sales Agent A" for contacting sales leads. According to embodiments, email column 406 and phone column 408 may include pseudo-contact information provided to "Sales Agent A." In the illustrated example, email addresses displayed in email column 406 include unique prefixes and suffixes such that upon expiration of the corresponding sales lead, the current pseudo-email address may be disabled and regenerated as a new pseudo-email address with new prefixes and/or suffixes. Similarly, a current pseudo-phone number displayed in phone column 408 may be disabled upon expiration of the corresponding sales lead and regenerated as a new pseudo-phone number including a different area code and/or phone number sequence.

Status column 410 indicates the status of a sales lead. For example, as shown in the illustrated embodiment, a sales lead may be completed, pending, expired, or require a follow up. Time remaining column 412 indicates a time remaining for "Sales Agent A" to complete a given task for a given sales lead. The given task may include, but not limited to, contacting the lead, closing a sale, or any other task resulting in a sales lead disposition.

Sales lead 414 for "Howard Anderson" illustrates an example of a sales lead that has expired as a result of "Sales Agent A" failing to complete a given task before expiration of the sales lead. Accordingly, the pseudo-email address and the pseudo phone number for sales lead 414 may be disabled and inoperable to contact the sales lead. The sales lead 414 may subsequently be reassigned to another agent as further illustrated in FIG. 5.

Figure 5:
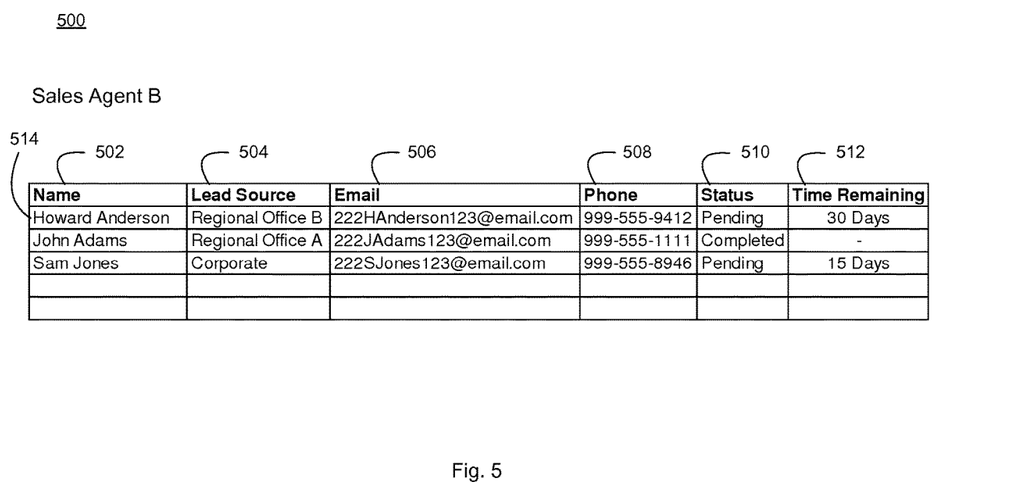
FIG. 5 illustrates re-assigned contact information on a sales lead docket according to one embodiment of the present invention.

FIG. 5 presents a docket 500 of "Sales Agent B" according to an embodiment of the present invention. Docket 500 may similarly include a name column 502 that lists the names of contacts associated sales leads, a lead source column 504 that identifies a source of a given sales lead, an email column 506 that displays a pseudo-email address for a given contact, a phone column 508 that displays a pseudo-phone number for a given contact, a status column 510 that indicates the status of a sales lead, and a time remaining column 512 that indicates a time remaining for "Sales Agent B" to complete a given task for a given sales lead.

As mentioned above, a sales lead that has expired may be reassigned to another agent. In the illustrated example, the sales lead 414 associated with "Howard Anderson" from FIG. 4 may be reassigned and docketed to "Sales Agent B" as sales lead 514. Reassignment of a sales lead may include regenerating pseudo-contact information for the sales lead. Accordingly, the pseudo-email address displayed under email column 506 and pseudo-phone number displayed under phone column 508 may be regenerated pseudo-contact information for sales lead 514 such that prior agents are unable to contact the sales lead.

Figure 6:
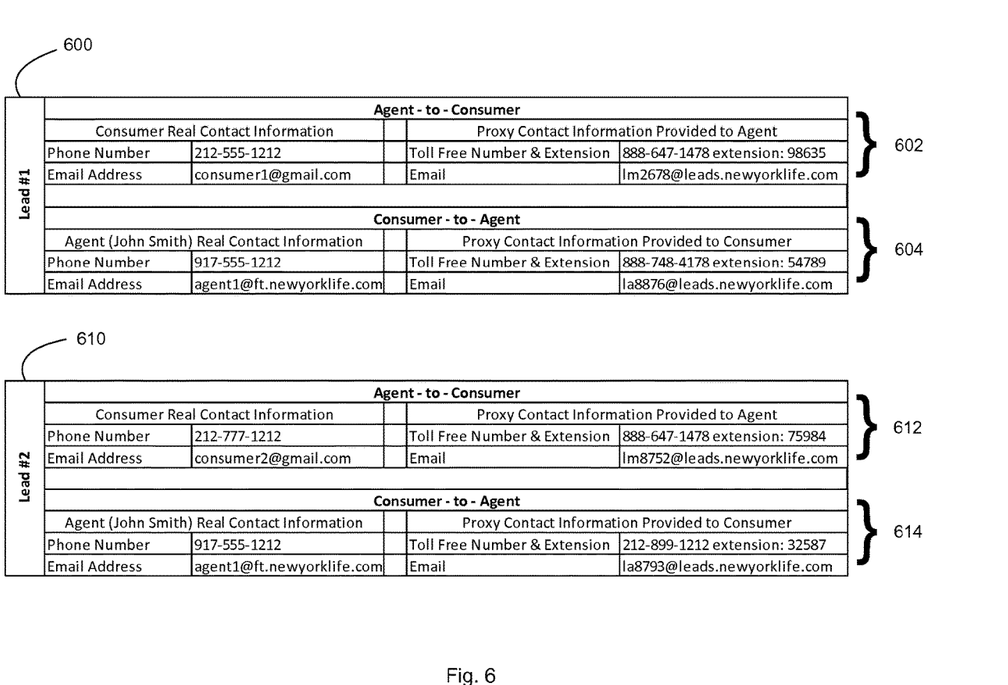
FIG. 6 illustrates exemplary contact information according to one embodiment of the present invention.

FIG. 6 presents exemplary contact information according to one embodiment of the present invention. Lead 600 includes actual information and proxy (pseudo) contact information for an agent and a lead #1. Agent-to-consumer information 602 provides proxy contact information to an agent in place of lead #1's real contact information. In the illustrated example, lead #1's real phone number (212-555-1212) may be provided to the agent as a toll free number and extension (888-647-1478 extension: 98635). Likewise, lead #1's email address (consumer1 @ gmail.com) may be provided to the agent as an email address that is uniquely generated by the sales lead manager or sales lead management server (lm2678@leads.newyorklife.com). Similarly, consumer-to-agent information 604 provides proxy contact information to the lead #1 in place of the agent's real contact information. The agent's real phone number (917-555-1212) may be provided as a toll free number and extension (888-748-4178 extension: 54789) and the agent's email address (agent1@ft.newyorklife.com) may be provided as a uniquely generated email address (la8876@leads.newyorklife.com). The proxy contact information can be associated with an agent and sent along with, for example, a marketing offer so that a consumer can reach the agent directly in response to the marketing offer, and the corresponding response can be tracked by the lead management system.

Lead 610 includes actual information and proxy contact information for the agent and a lead #2. Agent-to-consumer information 612 provides proxy contact information to an agent in place of lead #2's real contact information. The consumer's real phone number (212-777-1212) may be provided to the agent as a toll free number and extension (888-647-1478 extension: 75984). In the illustrated example, lead #1 and lead #2 shares a common toll free number but differ in extension. However, in other embodiments, the toll free number and/or extension number may differ. Lead #2's email address (consumer2@gmail.com) may be provided to the agent as a unique email address (1m8752@leads.newyorklife.com).

Consumer-to-agent information 614 provides proxy contact information to lead #2 in place of the agent's real contact information. The agent's real phone number (917-555-1212) may be provided to the consumer as a toll free number and extension (212-899-1212 extension: 32587), which differs from the proxy contact information provided to lead #1. According to another embodiment, the agent's proxy contact information provided to different leads may include a common toll free number with unique extensions, as opposed to the unique toll free numbers and extensions illustrated in FIG. 6. Additionally, the agent's email address (agent1 @ft.newyorklife.com) may be provided to the consumer as another uniquely generated email address (la8793@leads.newyorklife.com). Call and messages directed to the various proxy contact information of the agent that are provided to each lead may be received by the agent at the real contact information. That is, messages to "la8876@leads.newyorklife com" and "la8793@leads.newyorklife com" can be received by the agent at "agent1@ft.newyorklife.com," while calls to "888-748-4178 extension: 54789" and "212-899-1212 extension: 32587" can be received at the agent's real phone number "917-555-1212."

FIGS. 1 through 6 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A system for managing contact communications in a communication system platform interface, the system comprising:
   a database that stores a plurality of sales leads generated by a sales lead system, the plurality of sales leads including an actual contact information of a plurality of users and rankings of sales-readiness for the plurality of users based on a tracking of online and social media activities of the plurality of users associated with products and services;
   a sales lead management server configured to:
   retrieve data for a sales lead from the plurality of sales leads from the database based on a sales-readiness rank of the sales lead;
   generate a first pseudo-contact information, which corresponds to an actual contact information of the sales lead, wherein the first pseudo-contact information is uniquely corresponded to a first agent and includes a given lifetime;
   determine whether the first agent has performed, before an expiration of the given lifetime, a given task; and
   adjust a score associated with the first agent based upon a completion of the given task;
   a communication server communicatively coupled to the sales lead management server, the communication server configured to:
   provide the first agent with access to the first pseudo-contact information on a communication system platform;
   generate an interface for display on a client device of the first agent, the interface including communication functionalities linked to the first pseudo-contact information based on a user profile that is associated with the first agent;
   receive a communication request including the first pseudo-contact information from the client device of the first agent;
   establish a telecommunication connection between the client device of the first agent to a client device of the sales lead through a communications network by linking the first pseudo-contact information to the actual contact information of the sales lead;
   generate agent pseudo-contact information from actual contact information of the first agent; and
   render the first pseudo-contact information inoperative on the communication system platform based on the expiration of the given lifetime by unlinking the first pseudo-contact information associated with the first agent to prevent the first agent from contacting the sales lead after the expiration,
   wherein the agent pseudo-contact information remains constant if the sales lead is reassigned from the first agent to a second agent.

2. The system of claim 1, wherein the first pseudo-contact information is provided to the first agent instead of the actual contact information of the sales lead.

3. The system of claim 1, wherein adjusting a score associated with the first agent based upon the completion of the given task comprises:
increasing the score associated with the first agent upon the completion of the given task before the expiration of the given lifetime; and
decreasing the score associated with the first agent upon the expiration of the given lifetime when the given task is not completed.

4. The system of claim 1, wherein the communication server is further configured to display an advertising content including the agent pseudo-contact information that corresponds to the actual contact information of the first agent on the client device of the sales lead.

5. The system of claim 1, wherein the sales lead management server is further operable to:
reassign the sales lead to the second agent; and
regenerate, in a second pseudo-contact information, the first pseudo-contact information.

6. The system of claim 5, wherein the communication server is further operable to:
provide the second agent with access to the second pseudo-contact information on the communication system platform;
receive a communication request including the second pseudo-contact information from a client device of the second agent;
link the second pseudo-contact information to the actual information of the sales lead; and
establish a telecommunication connection between the client device of the second agent to the client device of the sales lead.

7. The system of claim 4, wherein the communication server is further operable to:
provide, as part of the advertising content, a marketing offer including the agent pseudo-contact information, wherein the agent pseudo-contact information is provided to the sales lead instead of the actual contact information associated with the first agent; and
monitor responsiveness of the first agent associated with the marketing offer.

8. A system for managing contact communications in a communication system platform interface, the system comprising:
a database that stores a plurality of sales leads generated by a sales lead system, the plurality of sales leads including actual contact information of a plurality of users and rankings of sales-readiness for the plurality of users based on a tracking of online and social media activities of the plurality of users associated with products and services; a sales lead management server configured to:
retrieve data for a sales lead from the plurality of sales leads from the database based on a sales-readiness rank of the sales lead;
generate first pseudo-contact information for the sales lead data, wherein the first pseudo-contact information is uniquely corresponded to a first agent and includes a given lifetime;
determine whether the first agent has performed, before an expiration of the given lifetime, a given task; and
adjust a score associated with the first agent based upon completion of the given task;
a communication server communicatively coupled to the sales lead management server, the communication server configured to:
provide access to the first pseudo-contact information on a client device of the first agent via a communication system platform;
generate an interface for display on the client device of the first agent, the interface including communication functionalities linked to the first pseudo-contact information based on a user profile that is associated with the first agent;
establish a telecommunication connection between the client device associated with the first agent to a client device associated with the sales lead data through a communications network;
generate agent pseudo-contact information from actual contact information of the first agent;
assign multiple tasks to accomplish using the first pseudo-contact information by the first agent before a deadline;
monitor activities of the client device of the first agent;
determine non-fulfillment of the tasks based on the monitored activities; and
render the first pseudo-contact information inoperative on the communication system platform based on the expiration of the given lifetime by unlinking the first pseudo-contact information associated with the first agent to prevent the first agent from contacting the sales lead after the expiration,
wherein the agent pseudo-contact information remains constant if the sales lead is reassigned from the first agent to a second agent.

9. The system of claim 8, wherein the sales lead management server is further configured to track communication attempts and successful telecommunications connections.

10. The system of claim 8, wherein the tasks include initiating one or more communication attempts, successful communication attempts, completion of a sale, and activity to advance progress of a potential sale.

11. The system of claim 8, wherein the sales lead management server is further configured to:
generate second pseudo-contact information for the sales lead data;
distribute the second pseudo-contact information to a client device of the second agent; and
assign tasks to accomplish using the second pseudo-contact information by the second agent before a second deadline.

12. The system of claim 11, wherein the second pseudo-contact information differs from the first pseudo-contact information.

13. The system of claim 8, wherein the communication server is further configured to display advertising content including the agent pseudo-contact information that corresponds to the actual contact information of the first agent on the client device of the sales lead.

14. The system of claim 8, wherein adjusting the score associated with the first agent based upon completion of the task comprises:
increasing the score associated with the first agent upon completion of the task before the expiration of the given lifetime; and
decreasing the score associated with the first agent upon the expiration of the given lifetime when the task is not completed.

* * * * *